United States Patent
Poehlmann et al.

(10) Patent No.: US 10,299,021 B2
(45) Date of Patent: May 21, 2019

(54) OPTICAL SIGNAL AMPLIFICATION

(71) Applicant: Alcatel Lucent, Boulogne Billancourt (FR)

(72) Inventors: Wolfgang Poehlmann, Stuttgart (DE); Rene Bonk, Stuttgart (DE)

(73) Assignee: ALCATEL LUCENT, Boulogne-Billancour (FR)

(*) Notice: Subject to any disclaimer, the term of this patent is extended or adjusted under 35 U.S.C. 154(b) by 0 days.

(21) Appl. No.: 15/565,302

(22) PCT Filed: Apr. 21, 2016

(86) PCT No.: PCT/EP2016/000647
§ 371 (c)(1),
(2) Date: Oct. 9, 2017

(87) PCT Pub. No.: WO2016/169653
PCT Pub. Date: Oct. 27, 2016

(65) Prior Publication Data
US 2018/0063609 A1    Mar. 1, 2018

(30) Foreign Application Priority Data

Apr. 24, 2015  (EP) .................................... 15305627

(51) Int. Cl.
*H04J 14/00* (2006.01)
*H04Q 11/00* (2006.01)
(Continued)

(52) U.S. Cl.
CPC ..... *H04Q 11/0067* (2013.01); *H04B 10/2587* (2013.01); *H04B 10/29* (2013.01);
(Continued)

(58) Field of Classification Search
CPC ....... H04Q 11/0067; H04Q 2011/0035; H04Q 2011/0039; H04B 10/2587; H04B 10/29
(Continued)

(56) References Cited

U.S. PATENT DOCUMENTS

| | | |
|---|---|---|
| 2009/0028562 A1 | 1/2009 | Gianordoli et al. |
| 2011/0020001 A1* | 1/2011 | Kim ................... H04J 14/0282 398/63 |

FOREIGN PATENT DOCUMENTS

| | | |
|---|---|---|
| EP | 2262133 | 12/2010 |
| WO | 2009082113 | 7/2009 |
| WO | 2013012361 | 1/2013 |

OTHER PUBLICATIONS

Prat, J. et al; Opticla Network Unit Based on a Bidirectional Reflective Semiconductor Optical Amplifier for Fiber-to-the-Home Networks; IEEE Photonics Technology Letters, IEEE Service Center, Piscataway, NJ, US, vol. 17, No. 1, Jan. 1, 2005; pp. 250-252; XP011124111; ISSN: 1041-1135; DOI:10.1109/LPT.2004.837487.

* cited by examiner

*Primary Examiner* — Mohammad R Sedighian
(74) *Attorney, Agent, or Firm* — McCracken & Gillen LLC

(57) ABSTRACT

A method for optical signal amplification in an optical communication system is presented. The optical communication system comprises an optical line terminal, a plurality of optical network units, an optical splitter and a plurality of circulators. The optical network units comprise each an optical amplifier. A first optical signal is sent in a downstream direction from the optical line terminal to a first circulator from the plurality of circulators. The first optical signal is further sent from the first circulator to a first optical network unit from the plurality of optical network units and it bypasses the optical splitter. The first optical signal is (Continued)

amplified in the optical amplifier of the first optical network unit to generate an amplified optical signal. The amplified optical signal is sent from the first optical network unit to the first circulator through the optical splitter and is further sent from the first circulator to a further of the plurality of optical network units.

10 Claims, 6 Drawing Sheets

(51) Int. Cl.
*H04B 10/2587* (2013.01)
*H04B 10/29* (2013.01)

(52) U.S. Cl.
CPC ............... *H04Q 2011/0035* (2013.01); *H04Q 2011/0039* (2013.01)

(58) Field of Classification Search
USPC .............................................. 398/67, 71, 72
See application file for complete search history.

OPTICAL SIGNAL AMPLIFICATION

TECHNICAL FIELD

This application is directed, in general, to optical transmission systems and, more specifically, to systems, apparatus and methods for amplification of optical signals.

BACKGROUND

A passive optical network (PON) is a network architecture employing fiber cables from a central office to local premises. It employs passive optical components to enable a single optical feeder fiber to serve multiple premises. A PON consists of a central office node, where the optical line terminal (OLT) equipment is located, one or more termination nodes at customer premises, called optical network terminations (ONT) or optical network units (ONU) and further infrastructure such as fiber, power splitters (PSs), filters, etc. which connect the central office node to the termination nodes. This infrastructure is called the optical distribution network (ODN). In other words, the ODN provides the optical transmission medium from the OLT towards the ONUs and vice versa. The ODN comprises a plurality of optical links and passive optical components arranged so as to form a point to multipoint structure whose root is connected to the OLT. In a passive optical network, a single optical fiber, referred to as feeder fiber and acting as an optical path, guides the light towards the remote node (RN) where it is delivered to the different drop sections by means of data splitters, filters, or any other passive equipment. More specifically, the optical path may split at an optical splitter or power splitter into several branch paths, with each branch path connected to a single ONU by a port of the splitter. From the RN the light is guided through the optical path towards the customer premises which are considered as endpoints. These are referred to as ONT if the unit serves one single endpoint or ONU if the unit serves multiple endpoints. On the uplink, the ONT/ONU sends user data back to the OLT using the same or a different wavelength. With the term uplink or upstream we refer to signals travelling from the ONUs to the OLT. With the term downlink or downstream we refer to signals travelling from the OLT to the ONUs.

The optical attenuation caused by the various components of the ODN adds up to values, which nowadays are bridged by transmitters and receivers from the endpoints of this ODN. Typical performance data for 10 Gbit/s are a reach of up to 40 km and split up to 64. There is a need to extend the reach and split factors in ODNs, especially due to the introduction of long reach PONs. Today the reach and split ratio of an ODN can be extended by inserting an optical amplifier (OA) in the network. The most usual position of the OA is in the remote node (RN) after the typically 60-90 km feeder line and before the power splitter (PS) of 128-512 and 0-10 km drop fiber. In the current state of the art an optical amplifier for each direction (downstream and upstream) is added.

To have optical amplification in the RN has the disadvantage that the OA needs to have access to an electrical power supply in order to operate. As the existing RN is based on passive components, it typically does not have access to electrical power.

SUMMARY

It is an object of the present invention to obviate the above disadvantage and provide methods, an optical device and an optical communication system which offer an advantageous amplification of optical signals without the need of access to electrical power.

According to one aspect of the invention, a method for optical signal amplification in an optical communication system is provided. The optical communication system comprises an optical line terminal, a plurality of optical network units, an optical splitter and a plurality of circulators. The optical network units comprise each an optical amplifier. A first optical signal is sent in a downstream direction from the optical line terminal to a first circulator from the plurality of circulators. The first optical signal is further sent from the first circulator to a first optical network unit from the plurality of optical network units and it bypasses the optical splitter. The first optical signal is amplified in the optical amplifier of the first optical network unit to generate an amplified optical signal. The amplified optical signal is sent from the first optical network unit to the first circulator through the optical splitter and is further sent from the first circulator to a further of the plurality of optical network units.

According to another aspect of the invention, a further method for optical signal amplification in an optical communication system is provided. The optical communication system comprises an optical line terminal, a plurality of optical network units, an optical splitter and a plurality of circulators. The optical network units comprise each an optical amplifier. A first optical signal is sent in an upstream direction, opposite to the downstream direction, from an optical network unit from the plurality of optical network units to a first circulator from the plurality of circulators. The first optical signal is further sent from the first circulator to the optical splitter. The optical splitter sends the optical signal to a further circulator from the plurality of circulators and this signal is further sent from the further circulator to a further optical network unit from the plurality of optical network units. The optical signal is amplified in the optical amplifier of the further optical network unit and thus an amplified optical signal is generated. The amplified optical signal is sent from the further optical network unit to the first circulator and it bypasses the optical splitter. Finally the amplified optical signal is sent from the first circulator to the optical line terminal.

According to yet another aspect of the invention, an optical network unit for optical signal amplification in an optical communication system is proposed. The optical network unit comprises an interface which is adapted to receive an optical signal. The optical network unit also comprises an optical amplifier which can amplify an optical signal received by the first interface. After the amplification an amplified optical signal is generated. The interface is also adapted to transmit an optical signal and also the amplified optical signal.

According to a further aspect of the invention an optical communication system is proposed. The optical communication system comprises an optical line terminal which is adapted to send and receive optical signals. The optical communication system also comprises a plurality of optical network units which are adapted to send and receive optical signals. The optical communication system also comprises an optical splitter which is adapted to distribute optical signals to the plurality of optical network units. Finally the optical communication system comprises a plurality of circulators which are adapted to direct the optical signals between the optical line terminal, the plurality of optical network units and the optical splitter. The optical network units comprise each an optical amplifier adapted to amplify an optical signal to generate an amplified optical signal.

The basic idea of the invention is that one of the ONUs in the communication network is selected and its OA is used for inline amplification for optical signals in the downstream and the upstream direction. The amplified signals generated by the amplification may then be distributed to the whole ODN and more specifically to the other ONUs in the network.

BRIEF DESCRIPTION OF THE DRAWINGS

Reference is now made to the following descriptions taken in conjunction with the accompanying drawings, in which.

DETAILED DESCRIPTION

Embodiments of optical devices and systems are described herein for amplifying an optical signal in a passive optical communication network.

Figure 1:
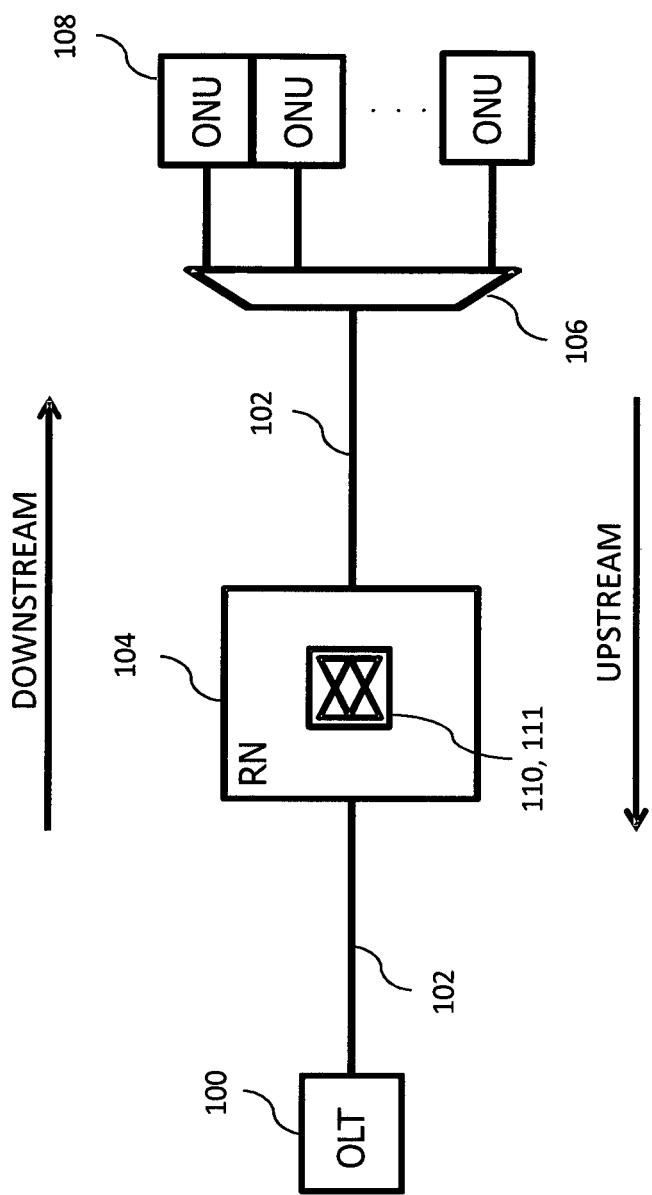
FIG. 1 shows a prior art passive optical network.

FIG. 1 shows a PON according to the prior art. The OLT 100 is connected via an optical feeder fiber 102 to a remote node RN 104. Downstream signals are transmitted by the OLT at respective downstream wavelengths to the remote node RN in a downstream direction (DS). An optical amplifier 110 in the downstream direction is placed before the power splitter 106 and amplifies the signals which are sent by the OLT. At the end of the feeder line 102, customer sided access network termination units in the form of optical network units (ONUs) 108 are connected. These ONUs 108 may alternatively be Optical Network Terminals (ONT). The ONUs 108 transmit respective upstream optical signals at respective upstream wavelengths that are assigned to the ONUs in an upstream direction (US). The upstream signals are combined by the power splitter 106 and sent over the feeder line 102 to the OLT. After the power splitter and before the OLT, another optical amplifier 111 placed in the RN in the upstream direction amplifies the signal which is sent by the ONUs, as one combined signal coming out of the power splitter 106. In the case that the PON is a Time-Wavelength-Division-Multiplex (TWDM) PON, the remote node RN contains the power splitter that combines the upstream signals.

Figure 2:
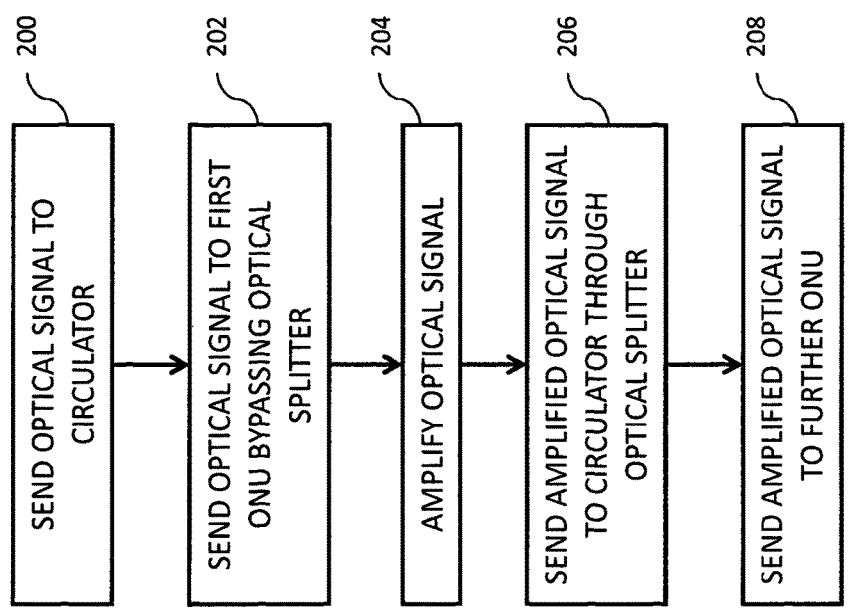
FIG. 2 shows a flowchart for a downstream signal amplification.

FIG. 2 shows a flowchart for a downstream signal amplification. In the downstream direction an optical signal is sent from the OLT 100 to the ONUs 108. The purpose is to amplify this signal before they reach the destination ONUs. In step 200 an optical signal is sent by the OLT to a circulator. This circulator sends the optical signal in step 202 further to one of the ONUs without passing an optical splitter. The ONUs contain by construction an optical amplifier which in this invention is used to amplify the optical signals. This happens in step 204 where the optical signal sent by the OLT is amplified by the optical amplifier of one of the ONUs. This amplification leads to the optical signal becoming amplified and thus it can be referred to as amplified optical signal. Further, in step 206 this amplified optical signal is sent from the ONU where it was amplified to the same circulator as above. In this case the amplified optical signal passes through an optical splitter. The circulator is configured so that it sends, in step 208, the amplified optical signal to one or more ONUs which are different from the ONU where the optical signal was amplified. Further, the downstream signal amplification will be described in more detail with the help of a block diagram.

Figure 3:
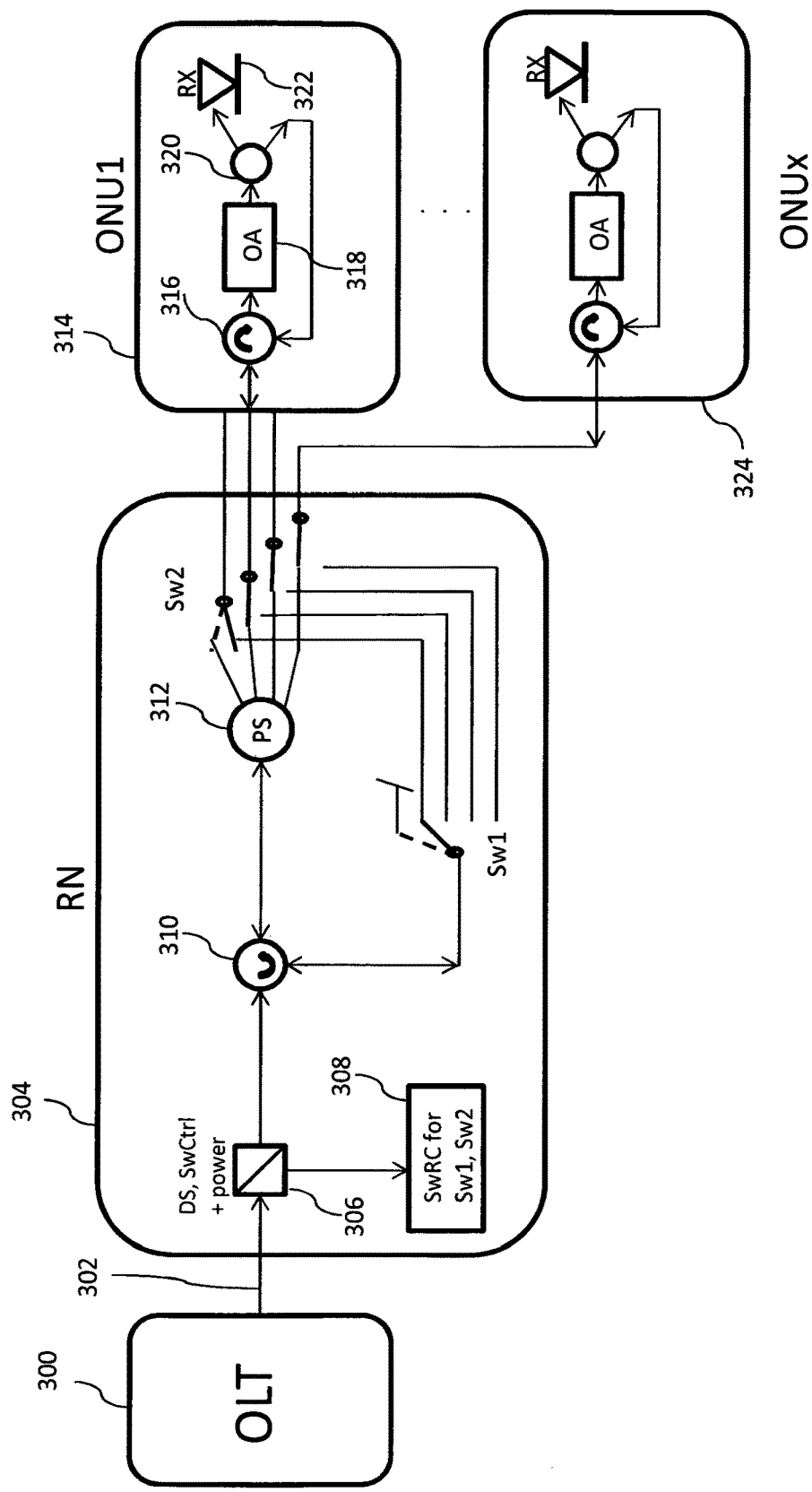
FIG. 3 shows a block diagram for a downstream signal amplification.

FIG. 3 shows a block diagram for a downstream signal amplification. The OLT 300 transmits simultaneously high bit rate data channels (more than single wavelength channel is also possible) as well as a single low-speed switch control signal. These signals are shown as DS and SwCtrl respectively in the figure. Both signals are located within 2 separate wavelength bands. For each of the possible remote switch Sw1 and Sw2 positions a single wavelength channel could be used or just one single channel with a coded information about the switch position that should be activated. The DS and the SwCtrl signals are transported over the feeder fiber symbolized by arrow 302 to the remote node RN 304. Within the RN, the DS data signals and the SwCtrl signal are separated by an optical filter 306.

The SwCtrl signal identifies the switch port by a switch remote control (SwRC). The DS data signal(s) are input to an optical circulator 310. The optical circulator 310 is configured to output the DS data signal towards the ONU1 314. In this way, ONU1 receives the DS signal after passing the drop fiber section without passing the power splitter 312. This is achieved by setting optical switches Sw1 and Sw2 to the appropriate positions. These optical switches can be co-located with the optical splitter. Based on registration information, the OLT knows which ONUs are active and available in the PON. Consequently the OLT can decide on one ONUs to be the ones which may amplify the optical signals. Accordingly the SwRC defines which switches (Sw1 and Sw2) need to be in place s that the optical signal reaches the correct ONU. This information is sent within the switch control (SwCtrl signal) by the OLT 300 to the RN 304.

The DS signal is then input to ONU1 314. The ONU1 comprises an optical amplifier OA 318. The DS signal(s) is amplified in the OA and is then sent to the circulator 310 passing through the power splitter 312. After the DS signal has been amplified it results in an amplified optical signal. This amplified signal is sent back by the circulator 310 to other ONUs symbolized as ONUx 324 in FIG. 3. The amplified signal can be sent from the circulator 310 to the ONUx either over the power splitter 312 or over the switches Sw1 and Sw2. All ONUs are identical to ONU1.

In an embodiment, ONU1 has an in built splitter 320. One port of this splitter directs the amplified DS signal to the ONUs receiver (RX) whereas the second port is reflecting the DS signal(s) by means of a reflector back to the rest of the elements as described above.

In another embodiment, an optical circulator 316 can be placed at the input of ONU1. In this way, the DS signals are input to the optical circulator 316 and are further sent to the OA 318. The output of the OA is connected to the power splitter 320. One output of the splitter 320 is then directed to the ONU-Rx and the other is directed to the circulator 316. This way, the amplified DS signal(s) are sent via the circulator 316 back to the direction of the RN.

Figure 4:
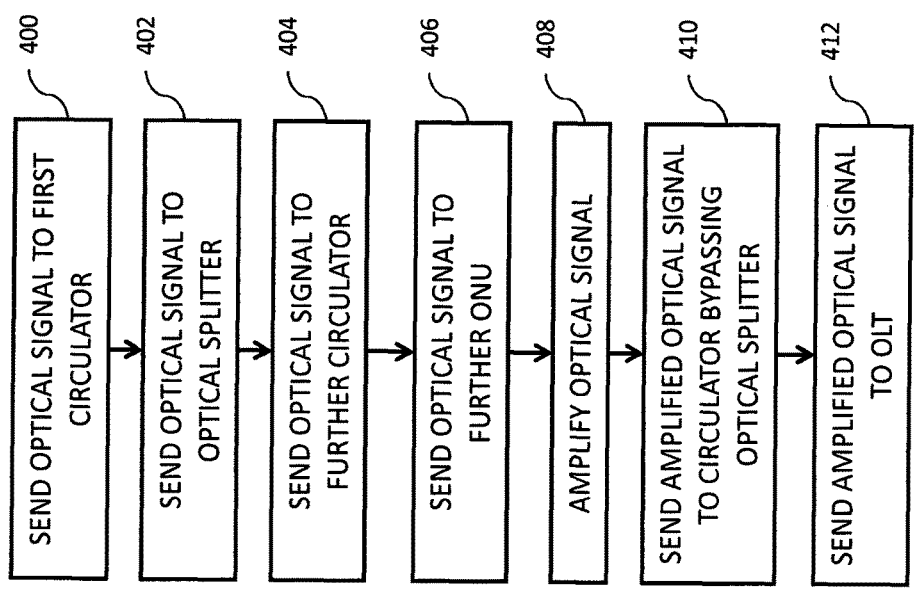
FIG. 4 shows a flowchart for an upstream signal amplification.

FIG. 4 shows a flowchart for an upstream signal amplification. In the upstream direction an optical signal is sent from the ONUs 108 to the OLT 100. The purpose is to amplify this signal before it reaches the destination OLT. In step 400, an optical signal is sent from an ONU to a circulator. This circulator can be called a first circulator. The circulator sends the optical signal further to an optical splitter in step 402. In step 404 the optical signal is sent by the splitter to another circulator which can be called a further circulator. Following that, in step 406 the circulator sends the optical signal to another ONU which is may be the same ONU which sent the signal in step 400 or a different ONU. We may refer to the ONU that receives the signal sent in step 406 as a further ONU. In step 408 the optical signal is amplified by the optical amplifier of the ONU, resulting in an amplified optical signal and in step 410 the amplified optical signal is sent to the circulator of step 400 without passing through the power splitter. In the last step 412, the amplified optical signal is sent by the circulator to the OLT.

Further, the upstream signal amplification will be described in more detail with the help of a block diagram.

Figure 5:
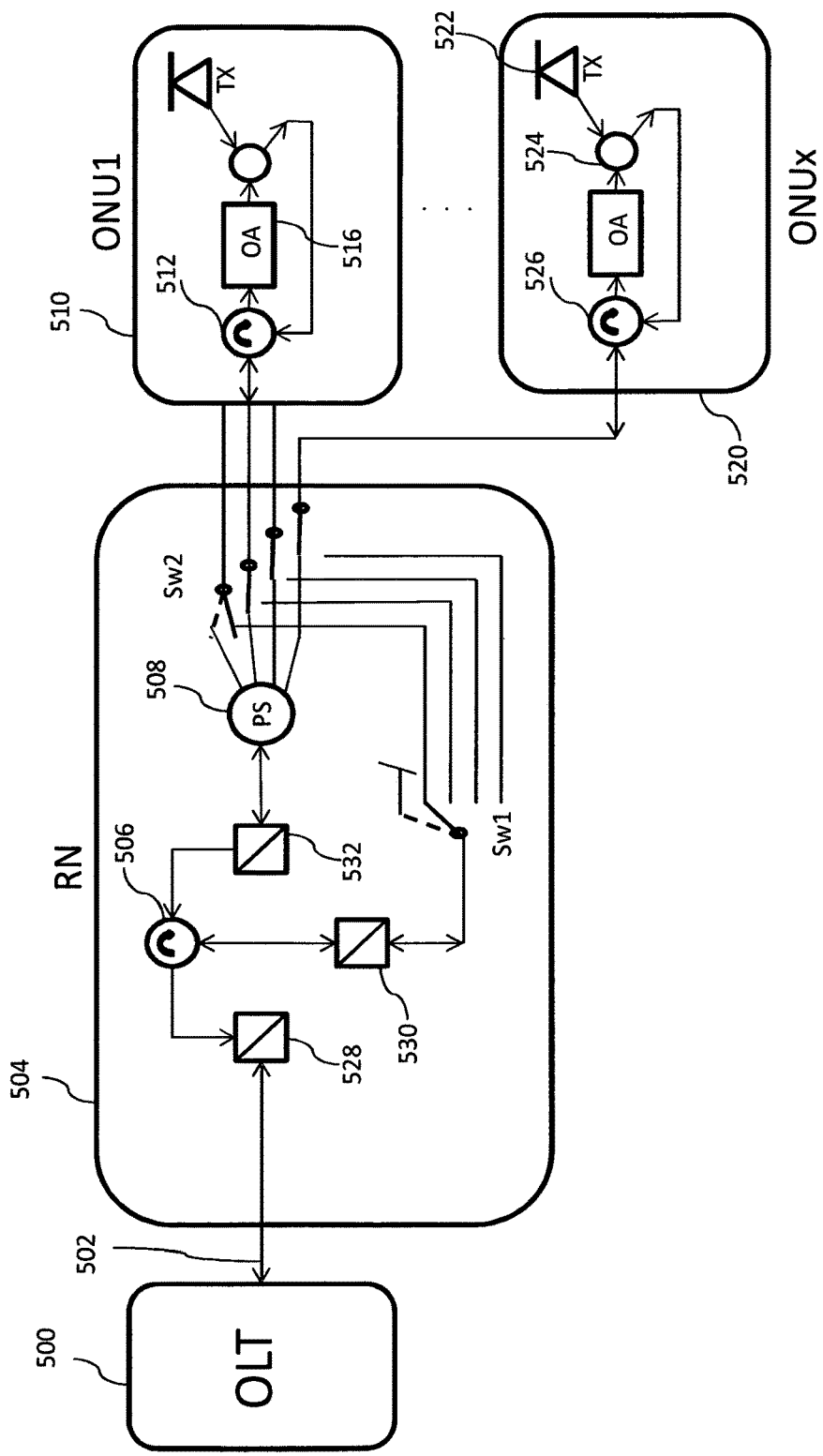
FIG. 5 shows a block diagram for an upstream signal amplification.

FIG. 5 shows a block diagram for an upstream signal amplification. In the upstream direction an optical signal is sent from one of the ONUx 520 towards the OLT 500. Before this signal reaches the destination OLT 500 it needs to be amplified. Initially the optical signal is sent over the transmitter TX 522 of the ONUx 520. The in built splitter 524 of ONUx sends the optical signal to the circulator 526 which is configured to forward this signal towards the RN 504. The signal reaches the RN 504 over its power splitter PS 508 as the Sw2 are in such a position to connect the circulator 526 with the PS 508. The circulator 526 can be called a first circulator. The optical signal is sent by the PS 508 to another circulator 506 which can be called a further circulator. The circulator 506 is configured in a way that it sends the optical signal received by the PS back towards another ONU which may be the same ONUx which initially sent the optical signal or a different ONU1. We may refer to the ONU towards which the signal is sent as a further ONU. When the signal reaches the ONU1 it passes through its optical amplifier and is thus amplified resulting in an amplified optical signal. The amplified optical signal is then sent to the circulator 512 which directs it towards the circulator 506. The Sw2 and Sw1 are connected in a way so that the amplified optical signal bypasses the PS 508. Finally the circulator 506 directs the amplified optical signal to the OLT 500. The filters 528, 530 and 532 are optional and may be used to filter out e.g. reflected signals resulting from connector reflections and Raleigh backscattering.

In both block diagrams of FIGS. 3 and 5, a circulator is placed in front of the power splitter in the RN. A separate circulator for US and DS is needed but an implementation with a common circulator for US and DS is also possible.

Figure 6:
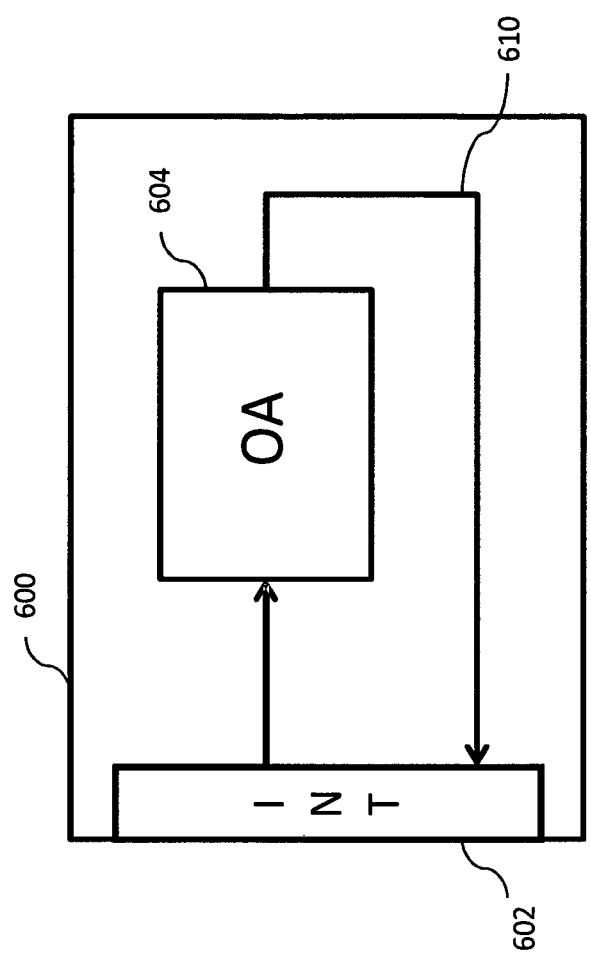
FIG. 6 shows an optical network unit according to the invention.

FIG. 6 shows an optical network unit 600 according to the invention. The unit comprises an interface 602. This interface is used to send and receive optical signals and direct them inside or outside the network unit. The interface 602 is connected with an optical amplifier 604 comprised also in the optical network unit. The purpose of the amplifier is to amplify optical signals when they go through it. An amplified signal coming out of the amplifier is directed to the interface 602 as shown in FIG. 6. The interface may further contain a receiver and a transmitter, like for example the ones shown in FIGS. 3 and 5. Further, the optical network unit may contain a power optical splitter. This splitter can be used to split amplified signals coming out of the optical amplifier in order to send a part of them to a receiver and a part of them to other optical network units. Finally the optical network unit may contain one or more circulators (not shown in the figure) which can direct signals according to the procedure described above in the text. In an embodiment the optical amplifier can be a reflective semiconductor optical amplifier (RSOA). In that case there are no circulators needed in the optical network unit in order to direct the optical signals.

The optical network unit 600 can be the ONU1 or any of the ONUx shown in FIGS. 3 and 5.

The invention claimed is:

1. A method for optical signal amplification in an optical communication system comprising an optical line terminal, a plurality of optical network units, said optical network units comprising each an optical amplifier, said optical communication system further comprising an optical splitter and a plurality of circulators, the method comprising the steps of
    sending a first optical signal in a downstream direction from the optical line terminal to a first circulator from the plurality of circulators;
    sending said first optical signal from the first circulator to a first optical network unit from the plurality of optical network units, the first optical signal bypassing the optical splitter;
    amplifying the first optical signal in the optical amplifier of the first optical network unit to generate an amplified optical signal;
    sending the amplified optical signal from the first optical network unit to the first circulator through the optical splitter and
    sending the amplified optical signal from the first circulator to a further of the plurality of optical network units.

2. The method according to claim 1 wherein in the step of sending the amplified optical signal from the first optical network unit to the first circulator through the optical splitter, the amplified optical signal is additionally sent to a receiver of the first optical network unit.

3. The method according to claim 1 wherein in the step of sending the amplified optical signal from the first optical network unit to the first circulator through the optical splitter, the amplified optical signal is alternatively sent to a receiver of the first optical network unit.

4. The method according to claim 1 wherein the further of the plurality of optical network units is different from the first optical network unit.

5. A method for optical signal amplification in an optical communication system comprising an optical line terminal, a plurality of optical network units, said optical network units comprising each an optical amplifier, said optical communication system further comprising an optical splitter and a plurality of circulators, the method comprising the steps of
    sending a first optical signal in an upstream direction, opposite to the downstream direction of claim 1, from an optical network unit from the plurality of optical network units to a first circulator from the plurality of circulators;
    sending said first optical signal from the first circulator to the optical splitter;
    sending said first optical signal from the optical splitter to a further circulator from the plurality of circulators;
    further sending said first optical signal from the further circulator to a further optical network unit from the plurality of optical network units;
    amplifying the first optical signal in the optical amplifier of the further optical network unit to generate an amplified optical signal;

further sending the amplified optical signal from the further optical network unit to the further circulator, the amplified optical signal bypassing the optical splitter and further sending the amplified optical signal from the further circulator to the optical line terminal.

6. The method according to claim 1 wherein the optical amplifier is a reflective semiconductor optical amplifier.

7. An optical communication system comprising:
- a first circulator of a plurality of circulators, said first circulator being configured to direct optical signals between optical devices;
- an optical line terminal configured to send a first optical signal in a downstream direction to said first circulator;
- a first optical network unit of a plurality of optical network units, said first optical network unit being configured to receive said first optical signal from said first circulator, wherein said plurality of optical network units comprise each an optical amplifier;
- a first optical amplifier of said first optical network unit, said first optical amplifier being configured to amplify said first optical signal to generate an amplified optical signal; and
- an optical splitter configured to receive said amplified optical signal from said first optical network unit and to forward said amplified optical signal to said first circulator;
- wherein said first circulator is configured to send said first optical signal to said first optical network unit with said first optical signal bypassing said optical splitter, and wherein said first circulator is further configured to send said amplified optical signal to a further of said plurality of optical network units.

8. The optical communication system of claim 7 wherein said first circulator is configured to direct signals to an inside or to an outside of said first optical network unit.

9. The optical communication system of claim 7 wherein said optical amplifier is a reflective semiconductor optical amplifier.

10. An optical communication system comprising:
- a first circulator of a plurality of circulators, said first circulator being configured to direct optical signals between optical devices;
- a first optical network unit of a plurality of optical network units, said first optical network unit being configured to send a first optical signal in an upstream direction to said first circulator, wherein said plurality of optical network units comprise each an optical amplifier;
- an optical splitter configured to receive said first optical signal from said first circulator and to forward said first optical signal to a further circulator of said plurality of circulators;
- a further optical network unit of said plurality of optical network units, said further optical network unit being configured to receive said first optical signal from said further circulator; and
- a first optical amplifier of said further optical network unit, said first optical amplifier being configured to amplify said first optical signal to generate an amplified optical signal;
- wherein said further optical network unit is configured to send said amplified optical signal to said further circulator with said amplified optical signal bypassing said optical splitter, and wherein said further circulator is further configured to send said amplified optical signal to an optical line terminal.

* * * * *